Feb. 19, 1963          B. G. FORMAN          3,078,334
INSERT MOLDED PLASTIC SELF TAPPING FASTENER
Filed July 20, 1959

3,078,334
INSERT MOLDED PLASTIC SELF TAPPING
FASTENER
Benjamin G. Forman, Kew Gardens, N.Y., assignor to
Formar Industries, Inc., Chicago, Ill., a corporation of
Illinois
Filed July 20, 1959, Ser. No. 828,172
1 Claim. (Cl. 174—138)

This invention relates generally to the field of non-conductive fasteners of a type in which a metallic core element is substantially enclosed within a synthetic resinous outer casing element.

Devices of this type are generally known in the art, and the invention lies in the specific constructional details permitting the device to be used as a self-tapping threaded fastener by providing an exposed metallic thread cutting tap which extends outwardly of the casing element, in such manner as to form a continuation with the plastic threads on the casing element, so that continuous rotational insertion of the fastener is possible.

It is among the principal objects of the invention to provide an improved non-conductive fastener possessed of the above characteristics which may be manufactured by mass production techniques existing in the art, thereby permitting devices embodying the invention to be manufactured at a reasonably low cost, with consequent wide sale, distribution and use.

Another object of the invention lies in the provision of a non-conductive self-tapping fastener of the class described which may be possessed of unusually high mechanical strength as compared with prior art devices.

A feature of the invention lies in the provision of an improved self-tapping non-conductive fastener possessed of the above advantages, which may be so constructed as to be completely insulative with respect to those portions of the same which will be exposed, notwithstanding the presence of an exposed metallic tapping portion at the leading end of the threaded shank thereof.

Another feature of the invention lies in the ready adaptability of the same to a well-known synthetic resinous molding technique known as insert molding.

Another feature of the invention lies in the fact that a wide range of synthetic resinous and metallic materials may be employed in the manufacture of the inventive devices.

These objects and features, as well as other incidental ends and advantages, will become more clearly apparent during the course of the following disclosure, and be pointed out in the appended claim.

In the drawing, to which reference will be made in the specification, similar reference characteristics have been employed to designate corresponding parts throughout the several views.

Figure 1:
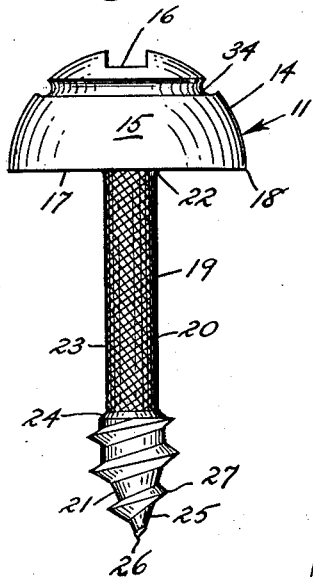
FIGURE 1 is a side elevational view of a metallic core element comprising a part of an embodiment of the invention.

In accordance with the invention, the device, generally indicated by reference character 10, comprises broadly: a metallic core element 11 and a synthetic resinous body or casing element 12.

The metallic core element 11 includes a head member 14 having an outer surface 15, tool engaging means 16 and an inner planar surface 17 bounded by a peripheral edge 18. The integrally formed shank member 19 includes a knurled portion 20 of reduced diameter immediately adjacent the head member, and a threaded portion 21 of substantially greater diameter.

At the interconnection of the upper part of the narrow portion 20 is an annular fillet 22, the narrowed outer surface 23 extending downwardly to a lower fillet 24 at the point of interconnection with the threaded portion 21. The threaded portion 21 includes a metallic outer surface 25 extending to the tip 26, and expanding type threads 27 commence at the tip 26 in well known manner.

The synthetic resinous shell element 12 is preferably formed upon the core element 11 by a technique well known in the art as insert molding. This method includes the supporting of the core element 11 within a mold, and the injection of synthetic resinous material into the cavity to enclose the head member 14 as well as the narrowed portion 20, while leaving exposed the threaded portion 21.

Figure 3:
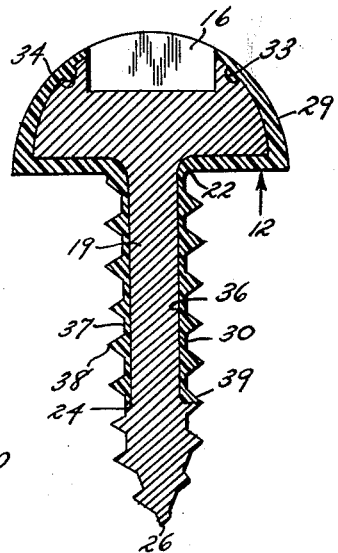
FIGURE 3 is a vertical longitudinal central sectional view as seen from the plane 3—3 in FIGURE 2.
Figure 2:
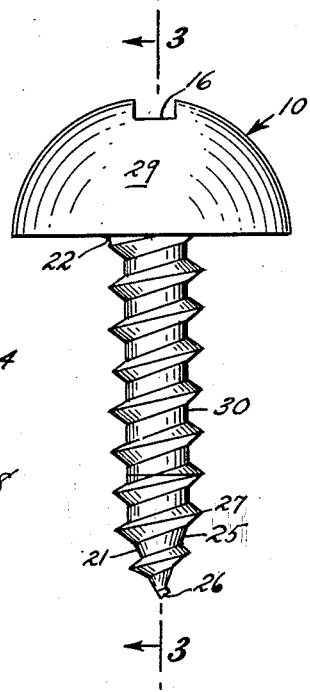
FIGURE 2 is a side elevational view showing a completed embodiment of the invention.
Figure 4:
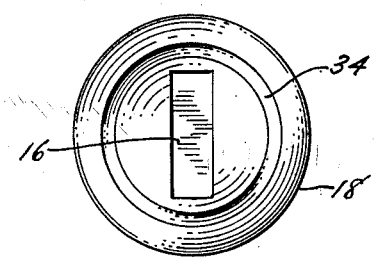
FIGURE 4 is a plan view of the embodiment.

As best seen in FIGURE 3, the head enclosing member 29 of the shell element 12 is preferably of tapered cross-section, and is provided with annular ridges 33 which extend into corresponding grooves 34 in the head member 14, to assist in obtaining a proper purchase on the outer surface 15. The tool engaging means 16 is employed to support one end of the core element 11 in the mold (not shown), and thus is unexposed to the flow of synthetic resinous material which forms the shell element 12. In like manner, the threaded portion 21 of the shank member 19 is similarly shielded from the flow of synthetic resinous material, and thus remains exposed as seen in FIGURE 2, so that metallic threads perform the actual tapping operation. It will be observed that the threads 27 expand to full diameter before the fillet 24 is reached.

The shank enclosing member 30 includes an inner surface 36 molded directly upon the knurled surface 23 so as to obtain adequate purchase thereon, as well as an outer surface 37 having threads 38 which form a continuation of the threads 27 at the lowermost end 39.

Figure 5:
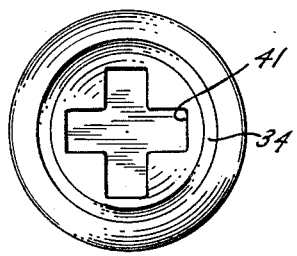
FIGURE 5 is a plan view of an alternate form of the embodiment.

In the alternate form of the embodiment seen in FIGURE 5, the conventional slotted type tool engaging means 16 is replaced by a "Phillips" socket, also well known in the art, in which case the socket, generally indicated by reference character 41 is also employed to support the metallic core element within the mold (not shown).

Figure 6:
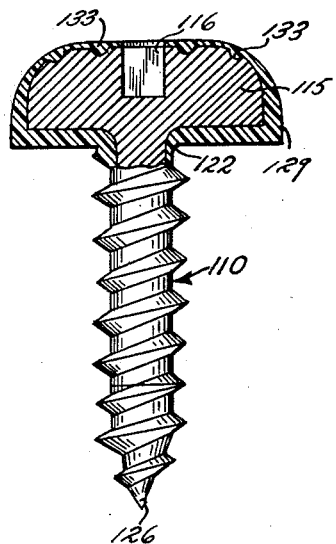
FIGURE 6 is a vertical longitudinal central sectional view corresponding to that seen in FIGURE 3, but showing a second alternate form of the embodiment.

The alternate form shown in FIGURE 6 is generally similar to the principal embodiment, and accordingly, parts corresponding to the principal form have been designated by similar reference characters, with the additional prefix "1."

The alternate form of FIGURE 6 differs from the principal form in the provision of a flatter head member 14, the other details of construction being substantially similar.

It may thus be seen that I have invented novel and highly useful improvements in self-tapping non-conductive fastener devices, in which a metallic tapping element is incorporated into the device in such manner that electrical shorting, or shocking a user of the device in which the fastener is installed is substantially impossible. In particular, where the device is used in conjunction with sheet metal, the fastener ultimately comes to rest with only its synthetic resinous parts in contact with the sheet metal, the exposed metallic threaded portion being disposed interiorly of the opening, so that should it touch any conducting object or part, no current is carried to the sheet metal, or to the exposed surface of the head member of the fastener.

By forming the metallic threaded portion integral with the head member of the device, great mechanical strength is obtained without sacrifice of the insulative properties of the device.

I wish it to be understood that I do not consider the invention limited to the precise details of structure shown and set forth in this specification, for obvious modifications will occur to those skilled in the art to which the invention pertains.

I claim:

A non-conductive, self-tapping fastener comprising: a metallic core element and a synthetic resinous shell element, said core element including a head member and an integral shank member, said shank member having a first portion which is free of threads, and enclosed by said shell element, and a second portion having an exposed threaded surface, said shell element having a threaded outer surface, the threads of which form a continuation of the threads of said second portion of said shank member; said shell element extending in a direction away from said second portion to completely enclose said head member, said head member having recessed tool-engaging means on a surface thereof, said shell element having an opening therein corresponding to and bordering said tool-engaging means.

References Cited in the file of this patent

UNITED STATES PATENTS

| | | |
|---|---|---|
| 483,806 | Hull | Oct. 4, 1892 |
| 635,297 | Caldwell | Oct. 24, 1899 |
| 1,177,810 | Rogness | Apr. 4, 1916 |
| 1,674,258 | Obergfell et al. | June 19, 1928 |
| 2,191,171 | Lee et al. | Feb. 20, 1940 |
| 2,314,770 | Cogswell | Mar. 23, 1943 |
| 2,432,986 | Forman | Dec. 23, 1947 |
| 2,678,585 | Ellis | May 18, 1954 |
| 2,890,845 | Kiekhaefer | June 16, 1959 |
| 2,993,950 | Forman | July 25, 1961 |

FOREIGN PATENTS

| | | |
|---|---|---|
| 53,665 | Holland | Dec. 15, 1942 |